United States Patent [19]

Keller

[11] Patent Number: 4,688,313

[45] Date of Patent: Aug. 25, 1987

[54] METHOD AND APPARATUS FOR REMOVING AND INSTALLING A PARTIALLY FIBROUS CAMSHAFT GEAR

[76] Inventor: John E. Keller, Box 56710, Hayward, Calif. 94545

[21] Appl. No.: 814,239

[22] Filed: Dec. 30, 1985

[51] Int. Cl.[4] .................... B23P 19/04; B23P 19/00

[52] U.S. Cl. .................... 29/238; 29/156.4 R; 29/402.08; 29/426.4; 29/426.5; 29/426.6; 29/525; 74/567

[58] Field of Search .................... 29/402.08, 238, 256, 29/281.1, 281.3, 281.6, 257, 258, 266; 100/299; 74/567; 123/90.31, 90.6

[56] References Cited

U.S. PATENT DOCUMENTS

| | | | |
|---|---|---|---|
| 2,818,617 | 1/1958 | Caswell | 29/281.1 |
| 2,872,728 | 2/1959 | Fraser | 29/256 |
| 2,892,252 | 6/1959 | Pruckner | 29/238 |
| 3,742,568 | 7/1973 | Hahlbeck | 29/281.6 |
| 3,997,961 | 12/1976 | Sandrick | 29/256 |

*Primary Examiner*—Howard N. Goldberg
*Assistant Examiner*—Irene Graves Golabi
*Attorney, Agent, or Firm*—Limbach, Limbach & Sutton

[57] ABSTRACT

The invention provides for the removal and replacement of a partially fibrous camshaft gear while engine (E) is in situ within a chassis. The method comprises chipping away the fibrous section of the gear, splitting the metal hub with a device (S) which peripherally surrounds the hub and forces a wedge into it, and forcing the replacement gear onto the camshaft using a press (P) whihc is mounted to the engine, and which utilizes the chassis as a brace during the development of pressure against the replacement gear. The press device (P) includes three members. The first member (38) mounts the press to the crankshaft, and accommodates engines with varying distances between the crankshaft and camshaft. The second member (40) is affixed to the first member (38) so that in conjunction with the first member the chassis (54) is accommodated and serves a bracing function. The third member (B) includes a stem (42) which is secured to the second member (40) at one end, extends almost to the camshaft, and carries elements (46, 48) which engage the camshaft gear. Movement of said elements (46, 48) along the stem (42) of the secured element develops the pressure which forces the gear onto the camshaft.

12 Claims, 6 Drawing Figures

METHOD AND APPARATUS FOR REMOVING AND INSTALLING A PARTIALLY FIBROUS CAMSHAFT GEAR

BACKGROUND OF THE INVENTION

The present invention relates to a method for removing and replacing a partially fibrous camshaft gear while the engine is in situ within a chassis. The method includes the use of two devices, one to split the metal hub of the gear after the fibrous section has been removed, and one to force the replacement gear onto the camshaft. The latter press device is of particular concern. This device, which mounts to the engine and brackets a portion of the chassis, develops the pressure to force the gear onto the camshaft by utilizing the chassis as a brace and counterforce. It also accommodates engines with varying distances between the crankshaft and camshaft.

The prior art teaches that the engine first is removed from the chassis; subsequently the damaged gear is removed, the replacement gear is installed, and the engine is remounted to the chassis. This process, which is carried out utilizing conventional pulleys and presses, is time consuming and thus expensive. The present technique, which utilizes a new type of press device for the installation of the replacement gear, removes the requirement that the engine be dismounted from the chassis.

SUMMARY OF THE INVENTION

The method and apparatus of the invention provides for the removal of a partially fibrous camshaft gear while the engine is in situ in the automobile chassis by removing the fibrous section, and then splitting the metallic hub of the gear with a device which peripherally surrounds the gear and drives a wedge into it. The replacement gear is also reinstalled in situ by aligning the gear and forcing it onto the camshaft with a press device. The press device is constituted of members which allow the device to be mounted to the engine and bracket the chassis and another member which in conjunction with the first two members develops the pressure to force the camshaft gear onto the camshaft.

A principal object of the invention is to provide a method and apparatus for the removal and replacement of a timing gear while the engine is in situ in the automobile chassis.

A more general object is to provide a method and apparatus which facilitates and speeds the process of removing a damaged gear and reinstalling a replacement gear on the camshaft.

Still another object is to remove the damaged gear in situ by utilizing a device which peripherally surrounds the metallic hub of the gear after the fibrous section has been removed, and which drives a wedge into the hub.

Yet another object is to reinstate the replacement gear utilizing a press device which mounts to the engine and brackets the chassis and develops the pressure to force the camshaft gear onto the camshaft.

Still another object is to provide a press device which facilitates and speeds the replacement of the camshaft gear in situ.

Yet another object related to the former is to provide a press device which utilizes the automobile chassis as a brace and counterforce during the development of pressure by the press.

Still another object is to provide a press device which accommodates varying distances between the crankshaft and the camshaft.

The foregoing and other objects will become apparent when viewed in light of the following detailed description and accompanying drawings.

DESCRIPTION OF THE PREFERRED EMBODIMENT

Figure 1:
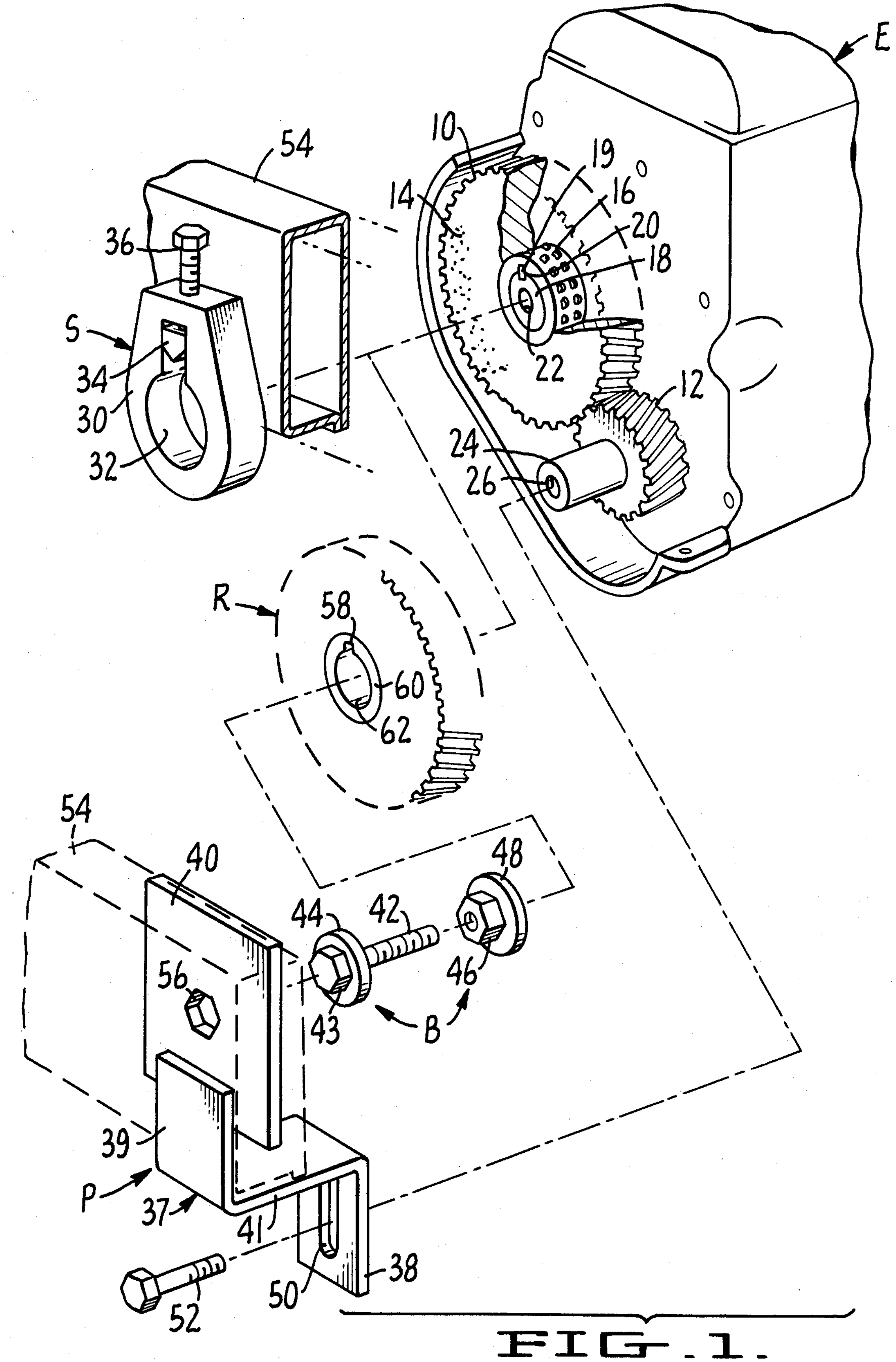
FIG. 1 is an exploded perspective view, with parts broken away and shown in phantom, which illustrates in combination with the engine the apparatus necessary for removing the camshaft gear and a press used for installing a replacement gear.

FIG. 1 illustrates the method for removal and replacement of the camshaft gear on an engine E located in situ in a chassis. The engine E is shown with the camshaft gear 10 and crankshaft gear 12 exposed. The camshaft gear 10 is comprised of a fibrous outer section 14 and a metal hub 16, and is mounted on the camshaft 18 which has a key 20 and a bore 22. The crankshaft gear 12 is mounted on the crankshaft 24 which contains a bore 26.

Figure 2:
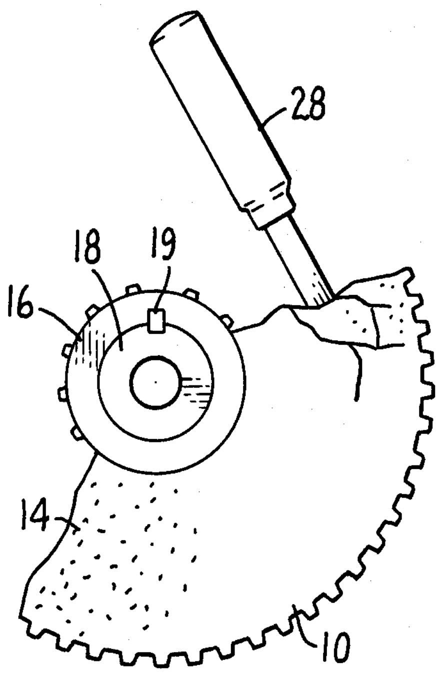
FIG. 2 is a front elevational view illustrating the fibrous section of the camshaft gear being chipped away.
Figure 3:
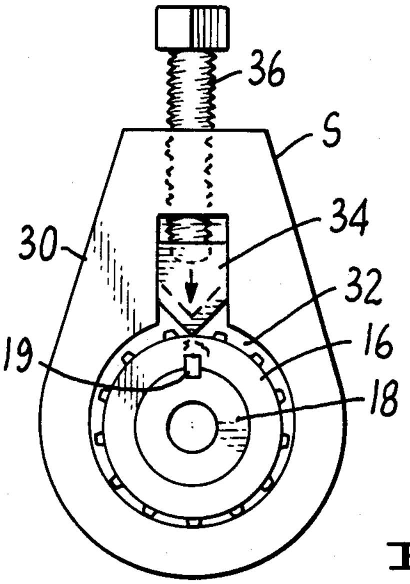
FIG. 3 is a front elevational view with parts shown in phantom, of the metal hub of the camshaft gear and the apparatus used to peripherally confine the hub and split it to remove the hub from the shaft.
Figure 4:
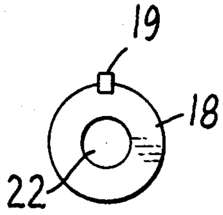
FIG. 4 is a front elevational view of the camshaft.

Removal of the camshaft gear 10 consists of two steps. First, as shown in FIG. 2, the fibrous section of the gear 14 is chipped away with a chisel 28. Second, as shown in FIG. 3, the remaining metal hub 16 is split with a splitter S to release it from the camshaft 18. As shown in FIG. 1, the splitter is comprised of a metal body 30 containing an inverted keyhole-shaped aperture 32 which can peripherally surround the metal hub 16 of the camshaft gear 10. A sharp wedge-shaped mobile member 34 is slidably received in the rectangular section of the aperture 32, and rotatably connected to a bolt 36. The bolt 36 is threaded through the metal body 30 of the splitter. The rectangular section of the aperture 32 accommodates the wedge-shaped member 34 permitting only inward and outward movement. As shown in FIG. 3, rotation of the bolt 36 causes the wedgeshaped member to move inwardly through the metal hub causing it to split and thus releasing the camshaft. FIG. 4 illustrates the exposed camshaft with its key 20.

Referring to FIG. 1, the replacement camshaft gear designated by the letter R is mounted on the camshaft 18 by use of a press, designated by the letter P. The press P is comprised of three major sections: a chair-shaped base 37; a rectangular bolt positioning plate or member 40 which is connected at one end to the horizontal portion 41 of the base 37; and a thrust bolt assembly designated by the letter B. The thrust member B is comprised of the thrust bolt 42, head 43, bolt collar 44, and thrust nut 46 and a nut collar 48.

Figure 5:
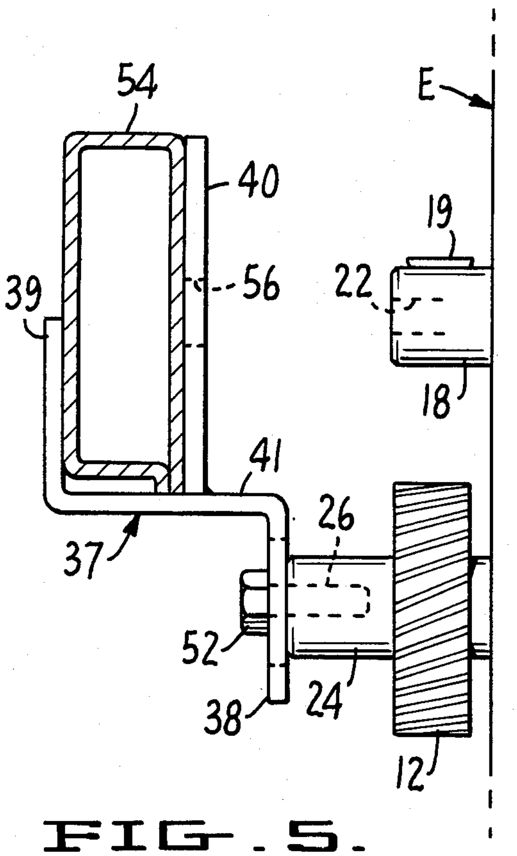
FIG. 5 is a side elevational view of the press affixed to an engine and braced to a chassis, without the bolt assembly in place.

The base 37 of the press P is comprised of two parallel vertical sections 38 and 39, respectively, each connected by one end to opposite ends of the horizontal section 41 and extending in opposite directions from the horizontal section. The vertical section 38 contains a vertical slot 50 which allows the press to be affixed to the engine via a bolt 52 which screws into the front bore 26 of the crankshaft 24. The length of the slot 50 allows the press to accommodate varying distances between the crankshaft and the camshaft. The bolt positioning member 40 is connected at one end to the horizontal section 41, is parallel with the vertical sections 38 and 39, and extends away from the vertical section 38. The distance between the bolt positioning member 40 and the planar vertical section 39 is such that the chassis will be accommodated and serve as a brace for the press. The bolt positioning member 40 contains a central hexagonal aperture 56 which accommodates the head of the thrust bolt 42. As shown in FIG. 5, when in place the press P is braced by a portion of the chassis 54 which fits between the bolt positioning member 40 and the planar section 39, and is affixed to the engine E by a bolt 52 screwed into the front bore 26 of the crankshaft 24.

Figure 6:
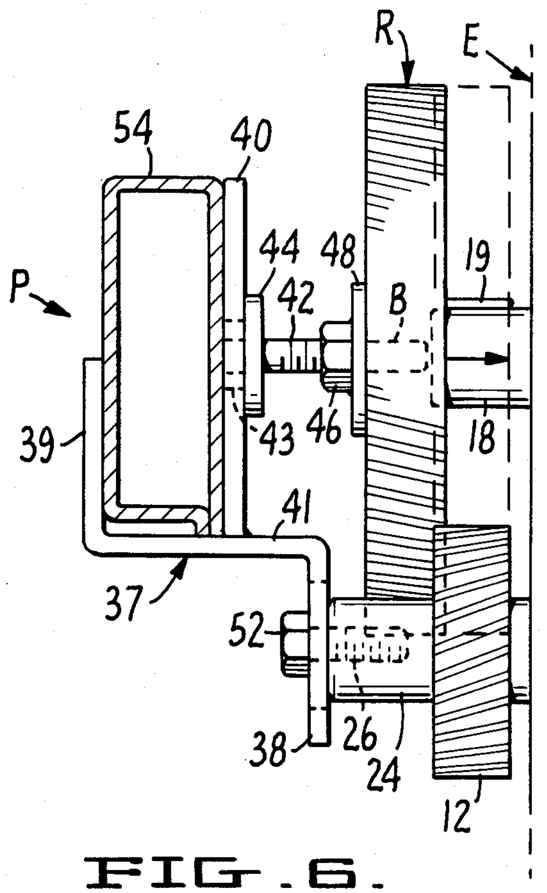
FIG. 6 is a side elevational view similar to FIG. 5 with the bolt assembly in place and in the process of installing a replacement camshaft gear, the direction of the thrust of the press is illustrated by the horizontal arrow.

FIG. 6 illustrates the use of the thrust bolt assembly B in the replacement of the camshaft gear. The replacement camshaft gear slot and camshaft key are aligned. The press base 37 and bolt positioning member 40 affixed to the engine E and chassis 54, as already discussed, are aligned with the camshaft. The thrust bolt assembly B is positioned so that the head of the thrust bolt 43 is inserted into the aperture 54 of the bolt positioning member 40 and is affixed therein by the bolt collar 44. The body of the bolt 42 penetrates the bore 62 of the replacement camshaft gear R until it almost meets the camshaft 18. The thrust nut 46 and nut collar 48 are rotated along the thrust bolt 42 until the collar 48 is in contact with the gear R. The desired horizontal pressure on the camshaft gear is accomplished by rotating the thrust nut 46 towards the engine E, causing the camshaft gear R to move further onto the camshaft gear 18 in the direction indicated by the arrow.

While a preferred embodiment has been illustrated and described, it should be understood that the invention is not intended to be limited to the specifics of this embodiment, but rather is defined by the accompanying claims. It should also be understood that the invention may find use in removing and replacing gears other than a camshaft gear.

What is clamed is:

1. A press device for installing a gear onto an engine mounted to a vehicle chassis, said press comprising: a first member, connecting means to secure the first member to the engine, a second member affixed to the first member such that a portion of the chassis can be inserted between the first and the second members, a third member mounted to the second member for select expansion into engagement with the gear to force the gear to engage with the engine.

2. A device according to claim 1 wherein said means is adapted to mount the first member of the device to the crankshaft of an engine.

3. A device according to claim 2 wherein said means is adapted to pass through the aperture in the first member, to secure said first member to an exposed aperture in the crankshaft of an engine and affix the first member to the crankshaft.

4. A device according to claim 1 wherein the first member is comprised of two parallel vertical sections each connected at one end to a horizontal section and extending in opposite directions from the horizontal section, and in which one of the vertical sections has an aperture through which said connecting means connects said first member to the engine.

5. A device according to claim 4 wherein the device is for installing a timing gear onto the camshaft of an engine, the means is adapted to mount the first member to the crankshaft of an engine, and the aperture is a vertical slot so that engines with varying distances between the camshaft and crankshaft may be accommodated.

6. A device according to claim 4 wherein the second member comprises a plate affixed at one end to the horizontal section of the first member so as to be parallel to the vertical sections of the first member.

7. A device according to claim 6 wherein the plate and one of the vertical sections are so spaced that a portion of the chassis may be accommodated therebetween so that when the press is expressed, the chassis provides counterforce.

8. A device according to claim 7 wherein the plate is formed with an aperture of such size and shape that an end of the third member can be mounted to it via insertion into the aperture.

9. A device according to claim 8 wherein the third member comprises: mounting means, means to secure the mounting means to the second member, and a pressure means which travels horizontally along the mounting means to engage and express pressure upon a replacement gear.

10. A device according to claim 9 wherein the means to secure the mounting means is of size and shape that it can be mounted into the aperture of the second member.

11. A device according to claim 9 wherein the mounting means includes a stem of a length such that when the mounting means is mounted to the second member, one end of the stem is in close proximity to the camshaft of the engine.

12. A device according to claim 11 wherein the pressure means is comprised of one element which may be rotationally driven along the stem of the mounting means and which in conjunction with a second element allows the operator to express pressure on the replacement gear.

* * * * *